March 15, 1927.
W. A. J. RIECK
1,621,028
SPRING SHACKLE STRUCTURE
Filed July 9, 1925
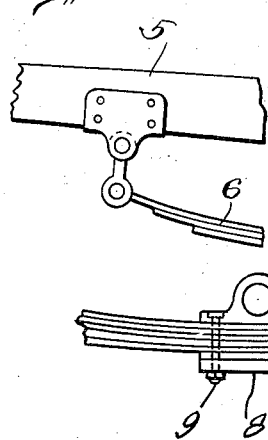
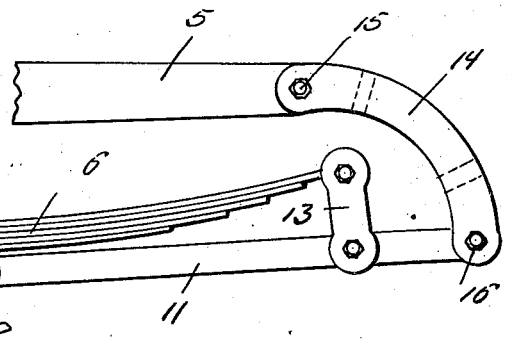
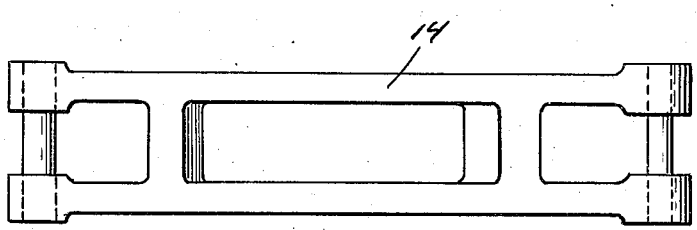
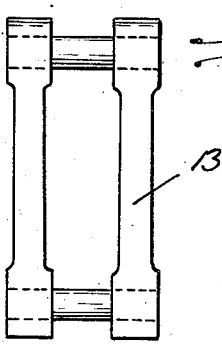
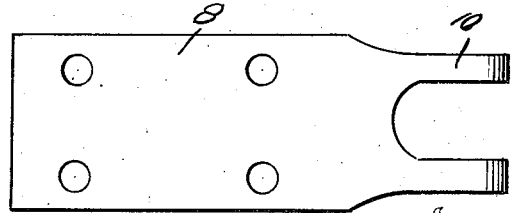
Inventor
William A. J. Rieck.
By Clarence A. O'Brien
Attorney Patented Mar. 15, 1927.

1,621,028

UNITED STATES PATENT OFFICE.

WILLIAM ALBERT JULIUS RIECK, OF TYLER, TEXAS.

SPRING SHACKLE STRUCTURE.

Application filed July 9, 1925. Serial No. 42,468.

The present invention relates to an improved spring shackle mounting used with automobiles and other like vehicles having for its principal object to utilize a compound leverage and shackle formation and arrangement whereby jars, jolts, and rebounds will be absorbed.

Another important object of the invention is to provide a mounting of this nature having a wide field of utility because of its simplicity in construction.

A still further object of the invention is to provide a mounting of this nature which is exceedingly strong, durable, inexpensive to manufacture, one which is efficient and reliable in use, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing

Figure 1 is an elevation of the mounting showing the same associated with a vehicle frame and a semi-elliptical spring, Fig. 2 is a plan view of the auxiliary shackle, Fig. 3 is a plan view of the shackle, Fig. 4 is a plan view of the bracket, and Fig. 5 is an elevation of the conventional mounting of the spring at the other end thereof, not shown in Figure 1.

Referring to the drawing in detail it will be seen that 5 designates the frame of a vehicle, 6 a semi-elliptical spring adapted to be mounted on an axle housing by the casting 7 in the usual manner. A bracket 8 is mounted at the under intermediate portion of the spring 6 by the bolts 9 which hold the casing 7 in place and is provided at one end with a pair of spaced apertured ears 10 for receiving therebetween one end of a bar 11 which is pivoted thereto by means of a bolt 12. The shackle 13 is usually pivoted to the end of the spring and to the frame 5 but in my improved structure the shackle 13 is not pivoted to the frame 5 but is pivoted to an intermediate portion of the bar 11. An auxiliary shackle 14 is pivoted to the end of the frame 5 as at 15 and to the end of the bar 11 as at 16.

It will be obvious that this arrangement of the shackles in conjunction with the bar 11 will absorb jars, jolts, and rebounds which are caused by the travel of the vehicle over an ordinary roadway.

The present embodiment of the invention has been disclosed in detail merely by way of example, since in actual practice it attains the features of advantage enumerated as desirable in the statement of the invention and the above description. It will be apparent that numerous changes in the details of construction, and in the combination and arrangement of parts as will be hereinafter more fully described and claimed.

Having thus described my invention, what I claim as new is:—

An attachment for an automobile; wherein the automobile includes among other elements a frame and a semi-elliptical spring associated with the frame; comprising a bracket attached to the under surface of the intermediate portion of the spring and extending toward one end thereof, a bar pivoted to the bracket and normally extending in substantial alinement therewith, a shackle pivoted at one end to the frame and extending downwardly thereto and pivoted at its other end to the bar, and a second shackle pivoted to the end of the spring and extending downwardly and pivoted to an intermediate portion of the bar.

In testimony whereof I affix my signature.

WILLIAM ALBERT JULIUS RIECK.